United States Patent Office 2,750,347
Patented June 12, 1956

2,750,347

PHENOL-FORMALDEHYDE POLYMER OF N-p-TOLUENESULFONYL-L-TYROSINE

Joseph F. Bunnett, Chapel Hill, N. C., assignor to the United States of America as represented by the Secretary of the Navy No Drawing. Application December 8, 1953, Serial No. 397,057

1 Claim. (Cl. 260—2.2)

This invention relates to a phenol-formaldehyde polymer of N-p-toluenesulfonyl-L-tyrosine, useful among other purposes as an ion-exchange resin.

An object of the invention is the preparation of an optically active phenol-formaldehyde polymer from N-p-toluenesulfonyl-L-tyrosine. This product is useful for its optical property as well as in ion-exchange processes.

Other objects and many of the attendant advantages of this invention will be readily apparent as the same becomes better understood by reference to the following detailed description when considered in connection with the following specific example.

Essentially, the product of this invention comprises a phenol-formaldehyde type polymer of N-p-toluenesulfonyl-L-tyrosine using phenol as a cross-linking agent and acid catalysis for both stages of polymerization in its preparation. N-p-toluenesulfonyl-L-tyrosine is itself optically active, and a large degree of optical activity is retained by the polymer.

The following example is illustrative of the invention using a preferred formula and process. N-p-toluenesulfonyl-L-tyrosine is one of the initial ingredients in the process. This ingredient can be obtained from any suitable source or can be prepared from any conveniently available related compounds. For example, L-tyrosine methyl ester hydrochloride can be converted to the methyl ester of N-p-toluenesulfonyl-L-tyrosine by a known method, originated by Fischer and Lipschitz and used with the corresponding ethyl ester, the ethyl ester can then be dissolved in a solution of potassium hydroxide, heated for some length of time, filtered, and then acidified to precipitate N-p-toluenesulfonyl-L-tyrosine. The N-p-toluenesulfonyl-L-tyrosine thus precipitated can be recrystallized for purification from water and ethanol.

In a preferred example, a mixture of 33.79 grams (0.101 mole) of N-p-toluenesulfonyl-L-tyrosine of $[\alpha]_D^{27} -8.9°$, 5.63 grams (0.0598 mole) of phenol, 28.4 grams of formalin (0.256 mole of formaldehyde), 43.1 grams of glacial acetic acid and 3 cc. of 6 N sulfuric acid was refluxed for 34 minutes by means of an oil bath at 125°–138° C. During this time a sticky white polymer slowly separated. The reflux condenser was removed and heating was continued another 42 minutes with the bath at 132°–140° C., causing most of the solvent to boil off and the polymer to become tough. When cold, the hard polymer was removed from the flask with a chisel, and soaked successively in 0.5 M ammonium hydroxide, in dilute hydrochloric acid, and in acetone. The acetone discharged a greenish discoloration, converting all the polymer to an orange-brown color.

A convenient method of using the resin in an ion-exchange process is to collect the afore-mentioned product in a suction filter, dry it by air, grind it in a mortar, and sift it. The ground material comprises primarily a golden powder and yellow and golden-brown granules. Choosing only the granules which pass through a 40 mesh sieve but not through an 80 mesh sieve, these granules are suspended in a very dilute ammonium hydroxide and allowed to settle. The very fine particles which do not settle rapidly are decanted off and the process is repeated until most of the "fines" are removed. The resin is then ready to put in a column.

A sample of the product obtained upon evaporation of an acetone extract dissolved in a sodium hydroxide solution showed $[\alpha]_D +21°$.

What is claimed is:

An optically active polymer formed by refluxing a mixture of N-p-toluenesulfonyl-L-tyrosine, phenol, formalin, glacial acetic acid, and sulfuric acid at a temperature of about 125° to 138° C. until the formation of a sticky white polymer, and thereafter further heating the mixture without refluxing at a temperature of about 132° to 140° C.

References Cited in the file of this patent

UNITED STATES PATENTS

| | | |
|---|---|---|
| 2,247,772 | D'Alelio | July 1, 1941 |
| 2,373,547 | D'Alelio | Apr. 10, 1945 |

FOREIGN PATENTS

| | | |
|---|---|---|
| 117,856 | Austria | May 26, 1930 |

OTHER REFERENCES

Bunnett et al.: J.A.C.S., vol. 74, December 5, 1952, pages 5893–7.